United States Patent
Sieg

(10) Patent No.: US 10,767,398 B2
(45) Date of Patent: Sep. 8, 2020

(54) VEHICLE DOOR HANDLE HAVING A CONTROL CIRCUIT

(71) Applicant: HUF HÜLSBECK & FÜRST GMBH & CO. KG, Velbert (DE)

(72) Inventor: Berthold Sieg, Bottrop (DE)

(73) Assignee: Huf Huelsbeck & Fuerst GmbH & Co. KG, Velbert (DE)

(*) Notice: Subject to any disclaimer, the term of this patent is extended or adjusted under 35 U.S.C. 154(b) by 224 days.

(21) Appl. No.: 16/091,016

(22) PCT Filed: Apr. 6, 2017

(86) PCT No.: PCT/EP2017/058290
§ 371 (c)(1),
(2) Date: Oct. 3, 2018

(87) PCT Pub. No.: WO2017/174745
PCT Pub. Date: Oct. 12, 2017

(65) Prior Publication Data
US 2019/0063118 A1  Feb. 28, 2019

(30) Foreign Application Priority Data
Apr. 7, 2016  (DE) .................. 10 2016 106 385

(51) Int. Cl.
*E05B 81/76* (2014.01)
*G07C 9/00* (2020.01)
(Continued)

(52) U.S. Cl.
CPC .............. *E05B 81/76* (2013.01); *B60R 25/20* (2013.01); *G07C 9/00309* (2013.01);
(Continued)

(58) Field of Classification Search
CPC ..... E05B 81/76; B60R 25/20; G07C 9/00309; G07C 9/00944; G07C 2009/00793; G07C 2209/65; E05Y 2900/531
See application file for complete search history.

(56) References Cited

U.S. PATENT DOCUMENTS 4,437,147 A * 3/1984 Takamura ............... H02M 7/10
  363/61
4,971,549 A * 11/1990 Geary ..................... F23N 5/123
  431/46

(Continued)

FOREIGN PATENT DOCUMENTS

JP  5589869 B2  9/2014
JP  5589870 B2  9/2014

OTHER PUBLICATIONS

International Preliminary Report on Patentability of International Application No. PCT/EP2017/058290 dated Oct. 9, 2018 (and English Translation Thereof), 17 pages.

(Continued)

*Primary Examiner* — Rexford N Barnie
*Assistant Examiner* — Kalu Kelly Emeaba
(74) *Attorney, Agent, or Firm* — Fay Sharpe LLP

(57) ABSTRACT

A vehicle door handle circuit coupled to a vehicle control unit includes a transmission antenna circuit, a control circuit and an actuation sensor via which the door handle circuit receives DC voltage for supplying the control circuit or AC voltage for controlling the antenna circuit. The antenna circuit includes a series oscillating circuit with an inductor and a capacitor. A series circuit including a first capacitor and a first rectifier is connected between two contacts and in parallel with the antenna circuit allows part of the AC voltage signal to be used for the voltage supply of the control circuit. A second rectifier connects one of the two contacts (Continued)

to the series circuit. A third rectifier is also provided in order to feed DC voltage to the vehicle control unit.

19 Claims, 3 Drawing Sheets

(51) Int. Cl.
| | | |
|---|---|---|
| *B60R 25/20* | (2013.01) | |
| *B60W 50/08* | (2020.01) | |
| *B60R 25/102* | (2013.01) | |
| *B64C 39/02* | (2006.01) | |
| *B60R 25/10* | (2013.01) | |
| *B60R 25/00* | (2013.01) | |
| *B63B 35/00* | (2020.01) | |

(52) U.S. Cl.
CPC ............... *B60R 25/00* (2013.01); *B60R 25/10* (2013.01); *B60R 25/1001* (2013.01); *B60R 25/102* (2013.01); *B60R 2325/10* (2013.01); *B60R 2325/20* (2013.01); *B60R 2325/30* (2013.01); *B60W 50/08* (2013.01); *B63B 2035/008* (2013.01); *B64C 39/024* (2013.01); *E05Y 2900/531* (2013.01); *G07C 9/00944* (2013.01); *G07C 2009/00793* (2013.01); *G07C 2209/65* (2013.01)

(56) References Cited

U.S. PATENT DOCUMENTS

| | | | | |
|---|---|---|---|---|
| 4,977,493 A | * | 12/1990 | Smith | ................... H02M 3/155 363/126 |
| 6,011,488 A | * | 1/2000 | Busser | ................... G01S 13/758 340/10.34 |
| 6,501,192 B1 | * | 12/2002 | Lubomirsky | ......... H02M 7/064 307/18 |
| 9,450,506 B2 | * | 9/2016 | Perreault | ................ H02M 7/217 |
| 2005/0237163 A1 | * | 10/2005 | Lee | ..................... G06K 19/0723 340/10.51 |
| 2008/0305749 A1 | * | 12/2008 | Ben-Bassat | ............... H01Q 1/24 455/77 |
| 2011/0256841 A1 | * | 10/2011 | Kakuya | .................... H04B 1/18 455/334 |
| 2014/0015597 A1 | | 1/2014 | Tabata et al. | |
| 2014/0361940 A1 | * | 12/2014 | Dykhouse | ................ H01Q 1/36 343/713 |
| 2015/0351171 A1 | * | 12/2015 | Tao | ........................ H05B 45/37 315/185 R |
| 2016/0170431 A1 | * | 6/2016 | Maier | .................... H02H 1/063 323/304 |

OTHER PUBLICATIONS

"Rectifier", Internet Citation, Jul. 26, 2009, pp. 1-10 (Retrieved from the Internet: URL:http://en.wikipedia.org/w/index.php?title=Rectifier&oldid=304232262 [Retrieved on Oct. 3, 2018]).

Anonymous: Cockcroft-Walton generator—Wikipedia, the free encyclopedia, Feb. 15, 2013, 3 pages (Retrieved from the Internet: URL:http://en.wikipedia.org/w/index.php?title=Cockcroft%E2S%80%93Walton_generator&oldid=538322242 [Retrieved on Oct. 3, 2018).

International Search Report of International Application No. PCT/EP2017/058290 dated Jun. 27, 2017, 6 pages.

* cited by examiner

State of the Art

VEHICLE DOOR HANDLE HAVING A CONTROL CIRCUIT

BACKGROUND

The present invention relates to a vehicle door handle circuit included in a vehicle door handle, configured for coupling to a vehicle-sided control device, the vehicle door handle circuit comprising an antenna circuit for emitting a signal to be sent, a control circuit and at least one actuation sensor, the control circuit being coupled to the actuation sensor for detecting an actuation, the antenna circuit comprising a series resonant circuit having a resonant circuit inductance and a resonant circuit capacitance, the vehicle door handle circuit having two contacts for coupling to the vehicle-sided control device via only two connection cables, via which the vehicle door handle circuit can receive a direct current supply voltage for supplying the control circuit or an alternating current voltage signal for driving the antenna circuit from the vehicle-sided control device, the antenna circuit being coupled between the two contacts, and the control circuit comprising two voltage supply junctions coupled to the two contacts.

The control circuit of the vehicle door handle circuit conventionally includes a microcontroller, which evaluates the signals of the actuation sensor for detecting an actuation of the vehicle door handle. The actuation sensor to which the control circuit is coupled, for example, can be a push button or a capacitive sensor. The transmitting antenna circuit in the vehicle door handle usually is driven by an alternating-current voltage to emit electromagnetic signals in the range of low frequency, for example, in a frequency range around 130 kHz.

The vehicle door handle by its first and second contact is coupled to the vehicle-sided control device only via two connection lines. The contacts can be formed by clamping, plug contacts or other contacting possibilities. Via these two connection cables, both the control circuit is supplied with voltage and the antenna circuit is driven to emit LF signals. Moreover, sensor signals are also transmitted to the control device via these two connection cables.

Numerous configurations of vehicle door handles, which feature sensor devices and also low frequency transmitting antennas, are known from the prior art.

One configuration according to the preamble of the present application can be concluded from the document JP 5589869 B2 as well as also from the document JP 5589870 B2.

These publications describe a door handle for use with so-called smart key systems or also smart entry systems. For this purpose, a user of a vehicle carries a wireless, portable device as a vehicle key. The device can be used for wirelessly locking or unlocking the door of a vehicle. Via the low-frequency antennas situated at the vehicle in the door handles, a vehicle-sided system emits signals, which are received by the portable device of the user. The portable device itself sends back information in the high-frequency range to the vehicle for identifying the portable device. There, this information is received by a suitable receiving arrangement (which is not located in the door handle), whereupon the identification is checked.

Both, the antenna for emitting the low-frequency signals and the means for detecting the actuation of the door handle are accommodated in the vehicle door handle. Regularly, the actuation by the hand of a user is detected in the door handle by sensor devices, for example capacitive proximity sensors or micro switches.

These devices in the vehicle door handle are coupled via a cable connector to a vehicle-sided control device. As disclosed by the aforementioned publications JP 5589869 B2 and JP 5589870 B2, the prior art mostly has featured configurations, in which the various lines, on the one hand, have been used for feeding and driving the low-frequency antenna and, on the other hand, for supplying the control circuit for detecting the actuation. In the document JP 5589870 B2, FIG. 6 shows such a system having a plurality of lines. For simplification purposes, the JP 5589870 B2 proposes to implement the driving and feeding of the antenna as well as of the control circuit via a shared line pair. For this purpose, FIG. 2 in JP 5589870 B2 shows a corresponding circuit, which here is reproduced in a simplified manner in FIG. 1. The line from the control device to the vehicle door handle is temporarily applied with a direct-current voltage to feed the control circuit and is temporarily applied with an alternating-current voltage, in particular a square-wave voltage, to drive the transmitting antenna.

For this purpose, the resonant circuit for the antenna circuit is situated in such a manner that, when applying a direct current voltage to the line, the antenna circuit blocks by its resonant circuit (the impedance becomes very large) and, for this reason, the direct current voltage is available at the control circuit. On the other hand, if an alternating current voltage is applied for exciting the resonant circuit, the antenna circuit sends the corresponding electromagnetic signals and its impedance becomes very small. In order to continuously supply the control circuit with voltage during this time, it is proposed in the prior art to tap off the voltage overshoot in the control circuit between capacitor and coil and to feed the voltage overshoot via a buffer capacitor into the control circuit.

It is the object of the invention to provide an alternative circuit arrangement for the described purpose.

BRIEF SUMMARY

This object is achieved by a vehicle door handle circuit included in a vehicle door handle having the features of patent claim 1.

According to the invention, a vehicle door handle circuit included in a vehicle door handle of the kind mentioned at the outset is characterized in that, for the purpose of using a portion of the alternating-current voltage signal for the voltage supply of the control circuit, a series circuit, which comprises a first capacitor with a first rectifier connected in series, is connected between the two contacts and in parallel to the antenna circuit, the first rectifier being connected in the reverse-biased direction with respect to the direct-current supply voltage, and a tap of the series circuit located between the first capacitor and the first rectifier is coupled with a first voltage supply junction of the control circuit, at least one second rectifier being coupled between the tap and the first voltage supply junction and/or between the second voltage supply junction and the node connecting one of the two contacts to the series circuit on the side of the first rectifier, the second rectifier being coupled to the tap or the node, respectively, in the opposite polarity vis-à-vis the first rectifier and that, for feeding the direct-current supply voltage of the vehicle-sided control device, a third rectifier is coupled between the contact of the two contacts, which is connected to the series circuit on the side of the first capacitor, and the first voltage supply junction of the control circuit, the third rectifier being connected in the forward-biased direction with respect to the direct-current supply voltage. The rectifiers, for example, are semiconductor diodes configured as discrete components or as part of an integrated circuit. In addition to the first capacitor and the first rectifier, said series circuit can comprise additional components, in particular an ohmic resistor. The polarity of the rectifiers is of course a function of whether the direct-current supply voltage is positive or negative. If it is mentioned here that the second rectifier is coupled in the polarity opposite vis-à-vis the first rectifier with the tap or the node, respectively, it means that one rectifier by its cathode and the other rectifier by its anode is coupled to the tap or the node, respectively.

While in the prior art mentioned at the outset a voltage uncoupling takes place at a tap between the capacitance and the inductance of the antenna series resonant circuit, in the arrangement according to the present invention, the control circuit with its upstream feed quadripole is simply connected in parallel to the antenna series resonant circuit coupled between the first contact and the second contact.

Functionally, the feed quadripole connected upstream from the control circuit includes an HF rectifier circuit comprising the first capacitor, the first rectifier and the second rectifier, and a direct-current voltage feed and inverse-polarity protection circuit comprising the third rectifier and bridging the HF rectifier circuit. The HF rectifier circuit comprises a circuit in the manner of a voltage doubler (in particular in the manner of a "Villard circuit"). Such a circuit delivers twice the voltage of the input voltage at a small power consumption.

In theory, for feeding the series resonant circuit with a perfect sine-wave voltage and a perfect tuning of the antenna resonant circuit, a vanishing impedance of the resonant circuit would result and, for this reason, a voltage which could be coupled into the feed quadripole of the control circuit coupled in parallel would not remain across the resonant circuit. The present invention, however, takes advantage of the surprising finding that, in practice, this is for different reasons not the case. As previously mentioned, the vehicle-sided control device for operating the low-frequency antenna resonant circuit regularly feeds a symmetrical square-wave voltage via the two connectors or contacts. Such a square-wave voltage has a plurality of harmonics, for which the impedance of the resonant circuit does not vanish. For this reason alone, sufficient voltage is regularly present across the resonant circuit, which can be used to supply the control circuit according to the structure according to the present invention.

Even if no square-wave voltage would be used or the portion of harmonics would not suffice, a voltage would be maintained owing to the circumstance that the antenna circuit is regularly mismatched for the in-fed frequency. This may result from capacitances in the connecting lines in the vehicle. The resonant circuits are however regularly configured in such a manner that they cover different frequencies in a certain frequency range. Then, the resonance is in a medium frequency range between the actually targeted frequencies.

If these effects should not suffice, it can be provided according to the present invention that the structure according to the present invention is configured in such a manner that the antenna circuit is slightly mismatched vis-à-vis the expected in-fed frequency to provide a sufficient voltage remaining for the supply of the control circuit. A suitable mismatch can be ascertained via a simple circuit simulation as a function of the expected excitation frequency and voltage.

For a feeding of the resonant circuit by a square-wave voltage, which is common here, the portion of harmonics for feeding the control circuit however mostly suffices. The circuit according to the present invention thus allows to supply the control circuit also in parallel to the antenna circuit for the total operating period of the antenna circuit. As soon as the vehicle-sided control device ceases to feed the antenna and switches again to a direct-current voltage supply of the vehicle door handle circuit, the supply of the control circuit is maintained because the resonant circuit of the antenna circuit and the first rectifier block and the third rectifier is operated in the forward direction and, thus, the two voltage supply junctions of the control circuit are connected via the two contacts to the supply lines of the control device providing the direct-current voltage.

In a first embodiment, the tap is coupled to the third rectifier in such a manner that the third rectifier is connected in parallel to the first capacitor, the second rectifier being coupled between the tap and the first voltage supply junction or between the second voltage supply junction and the node which connects one of the two contacts to the series circuit on the side of the first rectifier. In this embodiment, in the operating mode of the direct-current voltage supply by the control device, the third and second rectifiers are connected in series upstream of the control circuit, which, owing to the loss of voltage, results in a somewhat smaller supply voltage for the control circuit.

In a second preferred embodiment, the tap is coupled via the second rectifier to the third rectifier in such a manner that the third rectifier is connected in parallel to the first capacitor and the second rectifier. In this embodiment, in the operating mode of the direct-current voltage supply, only the third rectifier is connected in series to the control circuit.

In a preferred embodiment, the series circuit including the first capacitor and the first rectifier includes a first ohmic resistor. In this instance, the third rectifier is preferably connected in series using at least one second ohmic resistor. These measures have a current-limiting function.

In a preferred further development of the second embodiment of the vehicle door handle circuit, an ohmic resistor is coupled between one of the two contacts and the node connecting the series circuit to the third rectifier. This has the advantage that no further series resistor has to be used and, thus, allows for a circuit variant of the feed quadripole having a minimal number of components.

In a preferred further development of the vehicle door handle circuit, a second capacitor is connected between the voltage supply junctions of the control circuit. This capacitor smooths and buffers the voltage supply. Preferably, the second capacitor has a capacitance of 0.5 µF to 50 µF, for example of 4.7 µF.

Preferably, the first capacitor as part of the HF rectifier circuitry has a capacitance of 10 nF to 500 nF, in particular of about 100 nF. This value is in particular suitable for an antenna feed by about 134 kHz.

Advantageous and/or preferred embodiments of the present invention are characterized in the dependent claims.

BRIEF DESCRIPTION OF THE DRAWINGS

The present invention is now explained in greater detail on the basis of the preferred exemplary embodiments illustrated in the drawings. In the drawing.

DETAILED DESCRIPTION

Figure 1:
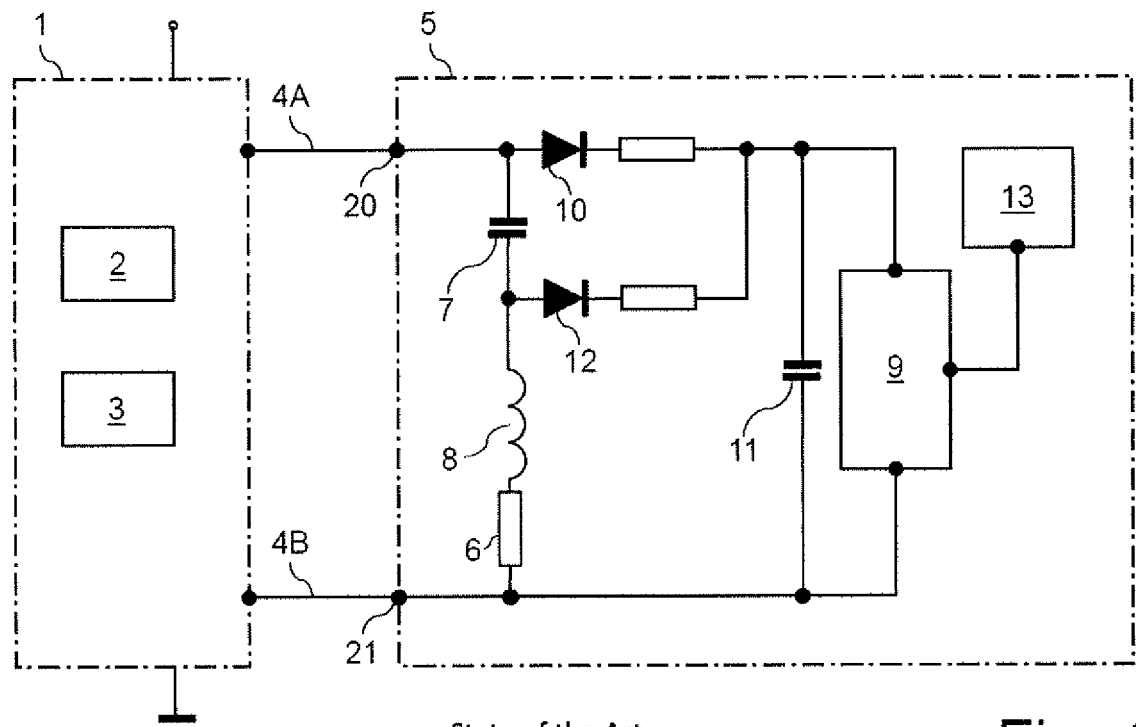
FIG. 1 shows a circuit according to the prior art.
Figure 2:
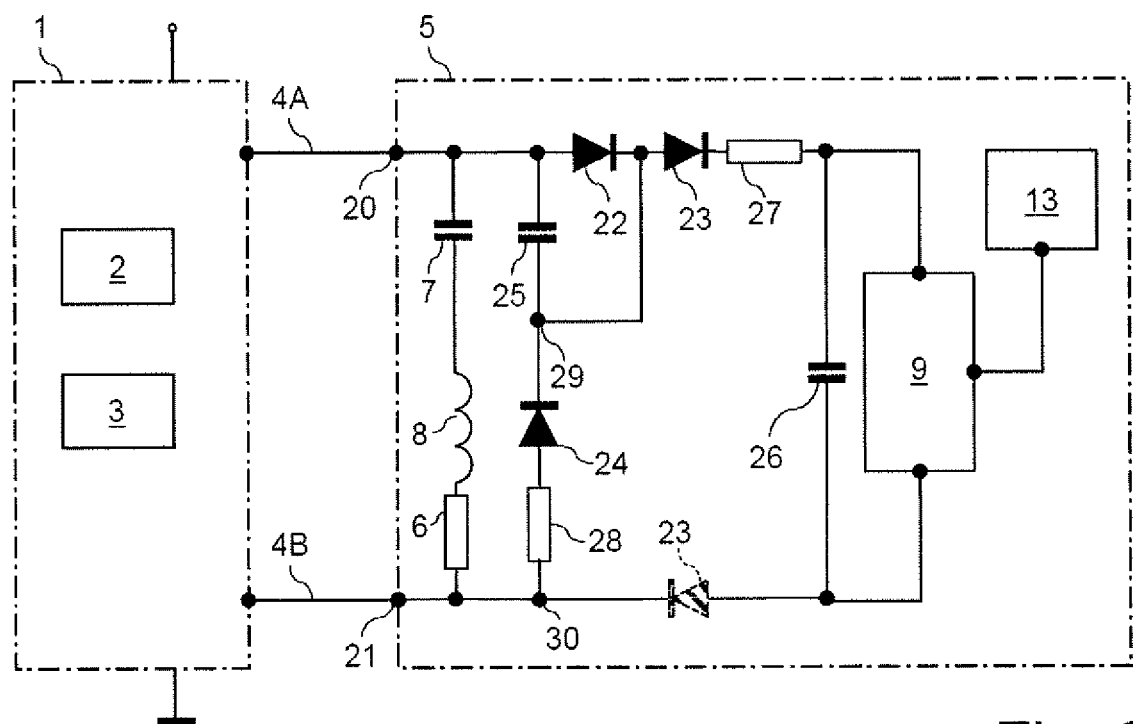
FIG. 2 shows a first embodiment of the circuit according to the present invention.

FIG. 1 shows a circuit, which is also known from the previously mentioned documents from the prior art, in particular from JP 5589870 B2, there in FIG. 2.

An ECU (electronic control unit) 1 is provided on the vehicle-side. This ECU has an antenna operating part 2 and a voltage supply part 3. ECU 1 is moreover coupled to the vehicle mass and the on-board voltage supply of the motor vehicle. ECU 1 guides two cables 4A and 4B to vehicle door handle circuit 5. A first contact 20 of vehicle door handle circuit 5 is coupled to cable 4A, and a second contact 22 of vehicle door handle circuit 5 is coupled to cable 4B.

Vehicle door handle circuit 5 situated within the vehicle door handle has an antenna series resonant circuit including a capacitance 7 and an inductance 8 and a control circuit 9 (the resistance 6 describes the ohmic resistance of the winding of the inductance). It is obvious that, for the case that a direct-current voltage is applied to contacts 20, 21, the resonant circuit with capacitance 7 and inductance 8 blocks and a supply of control circuit 9 is carried out via diode 10. A buffer capacitor 11 serves for stabilizing the voltage supply. If in contrast an alternating-current voltage is applied to the contacts 20, 21, the series resonant circuit becomes conductive, a sufficient voltage—in particular when approaching the resonance frequency—no longer being applied at control circuit 9. Diode 12 coupled to the tap between capacitor 7 and inductance 8 however makes it possible to use the excessive voltage between capacitor 7 and inductance 8 for supplying control circuit 9 even during operation in the transmitting phase of the antenna.

Sensor 13 is coupled to control circuit 9. In this instance, this may be a capacitive sensor or a push switch. Control circuit 9 evaluates the signals of sensor 13 to detect an actuation at the vehicle door handle. A signal indicating this detection is also transmitted via cables 4A and 4B from vehicle door handle circuit 5 to control unit 1 and is evaluated there.

FIG. 2 shows a first exemplary embodiment of vehicle door handle circuit 5 according to the present invention. On the vehicle-side—such as in the prior art—an ECU (electronic control unit) 1 is provided with an antenna operating part 2 and a voltage supply part 3. ECU 1 is moreover coupled to the vehicle mass and an on-board voltage supply of the motor vehicle. ECU 1 is connected to vehicle door handle circuit 5 via two cables or connection lines 4A and 4B. A first contact 20 of vehicle door handle circuit 5 is coupled to cable 4A representing the voltage supply line here. A second contact 22 of vehicle door handle circuit 5 is coupled to cable 4B representing a vehicle door handle mass here. The vehicle door handle mass of contact 21 can correspond to the vehicle mass of the control device, but its potential can also slightly deviate therefrom.

The series resonant circuit of vehicle door handle circuit 5 including capacitance 7, inductance 8 and ohmic resistor 6 is coupled between contacts 20 and 21. A feed quadripole circuit having an control circuit 9 coupled thereto is connected in parallel to the series resonant circuit. Again, sensor 13 is coupled to control circuit 9.

The feed quadripole circuit includes a series circuit of a first rectifier 24 (diode), a first capacitor 25 and a resistor 28, which is connected to the contacts 20 and 21 in parallel to the series resonant circuit. This series circuit has a tap 29 located between the first capacitor 25 and the cathode of the first rectifier 24. The anode of a second rectifier 23 is connected to tap 29. The cathode of second rectifier 23 is connected via a current-limiting resistor 27 to one of the two voltage supply junctions of control circuit 9. A buffer capacitor 26 is connected in parallel to the voltage supply junctions of the control circuit 9. Between the node connecting the first capacitor 25 to contact 20 and the node connecting tap 29 to the anode of the second rectifier, a third rectifier 22 is coupled in such a manner that it is connected in the forward-biased direction when feeding vehicle door handle circuit 5 with direct-current voltage.

Given an applied direct-current voltage between the first contact 20 and the second contact 21, the series resonant circuit is blocked and control circuit 9 is feed via rectifiers 22 and 23. If, however, an alternating-current voltage in the form of a square-wave voltage (free of direct-current voltage) is applied with a frequency approaching the resonant circuit resonance frequency, the resonant circuit consisting of capacitor 7 and inductance 8 is excited. In view of the square-wave voltage, however, at least the harmonics are not in resonance with the resonant circuit. These harmonics can be used by means of the circuit of this embodiment to supply circuit 9 with direct-current voltage. The third rectifier 22 represents an inverse-polarity protection for protecting the control circuit. Capacitor 25 in combination with rectifier 23 and rectifier 24 enables to increase the voltage resulting from the harmonics and to provide this voltage via buffer capacitor 26 to control circuit 9. Capacitor 25 and rectifiers 23, 24 form a voltage doubler circuit and generate a greater amount of direct-current voltage from the supplied alternating-current voltage (single-stage cascade).

This is possible, since there is no perfect match between the excitation voltage and the resonant circuit. This is in particular the case if a square-wave voltage is fed in. Otherwise, the resonant circuit can also be deliberately mismatched with regard to the input frequency to provide a sufficient voltage supply to control circuit 9.

Thus, the present invention functions, in particular, when the applied voltage does not have a perfect sinus-wave voltage with a perfect match to the resonant circuit.

Figure 3:
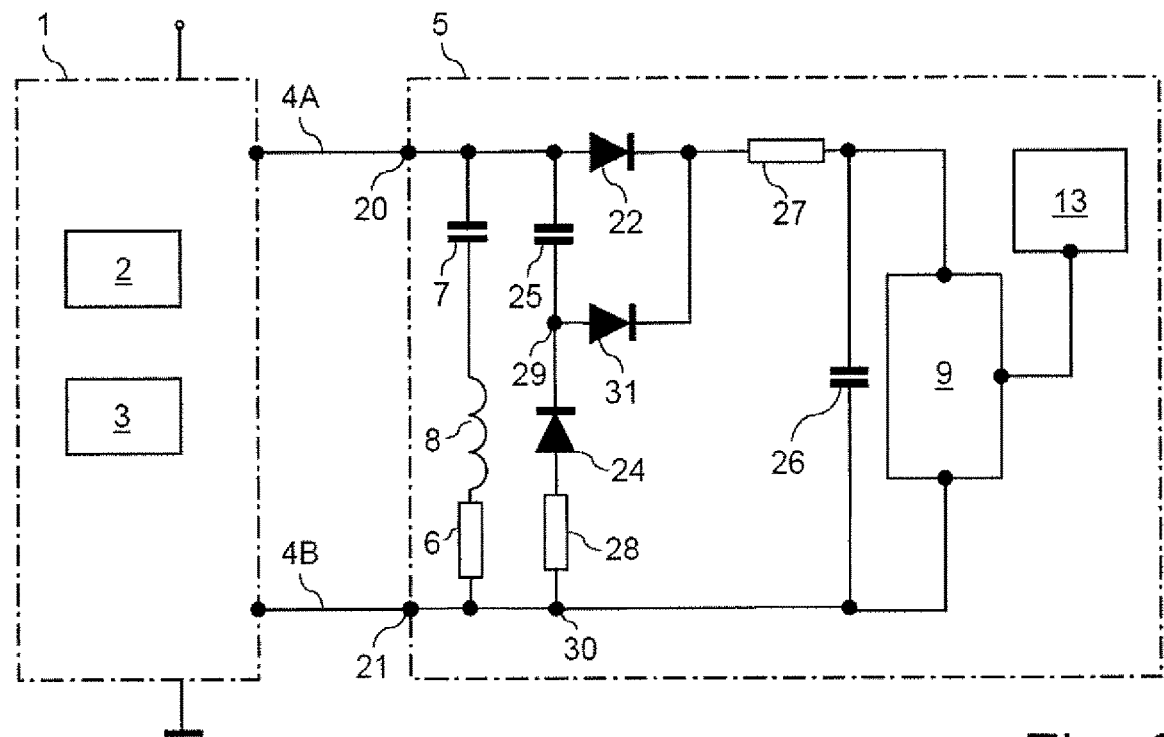
FIG. 3 shows a second embodiment of the circuit according to the present invention.

FIG. 3 shows an alternative embodiment of the circuit according to the present invention. Here also, the feed quadripole circuit includes a series circuit of a first rectifier 24, a first capacitor 25 and a resistor 28, which is connected to contacts 20 and 21 in parallel to the series resonant circuit. Again, this series circuit has a tap 29 situated between first capacitor 25 and the cathode of first rectifier 24. The anode of a second rectifier 31 is connected to the tap 29. The cathode of second rectifier 31 is connected via a current-limiting resistor 27 to one of the two voltage supply junctions of control circuit 9. A buffer capacitor 26 is connected in parallel to the voltage supply junctions of control circuit 9.

In this second exemplary embodiment, the third rectifier 22, which is connected in the forward-biased direction when feeding vehicle door handle circuit 5 with direct-current voltage, is coupled between the node connecting first capacitor 25 with contact 20 and the node connecting the cathode of the second rectifier 31 with the current-limiting resistor 27.

Thus, rectifier 22 is in parallel to a series connection of capacitor 25 and of rectifier 31. This results in that capacitor 25 is temporarily (during every second half-cycle) potential-free on one side.

Figure 4:
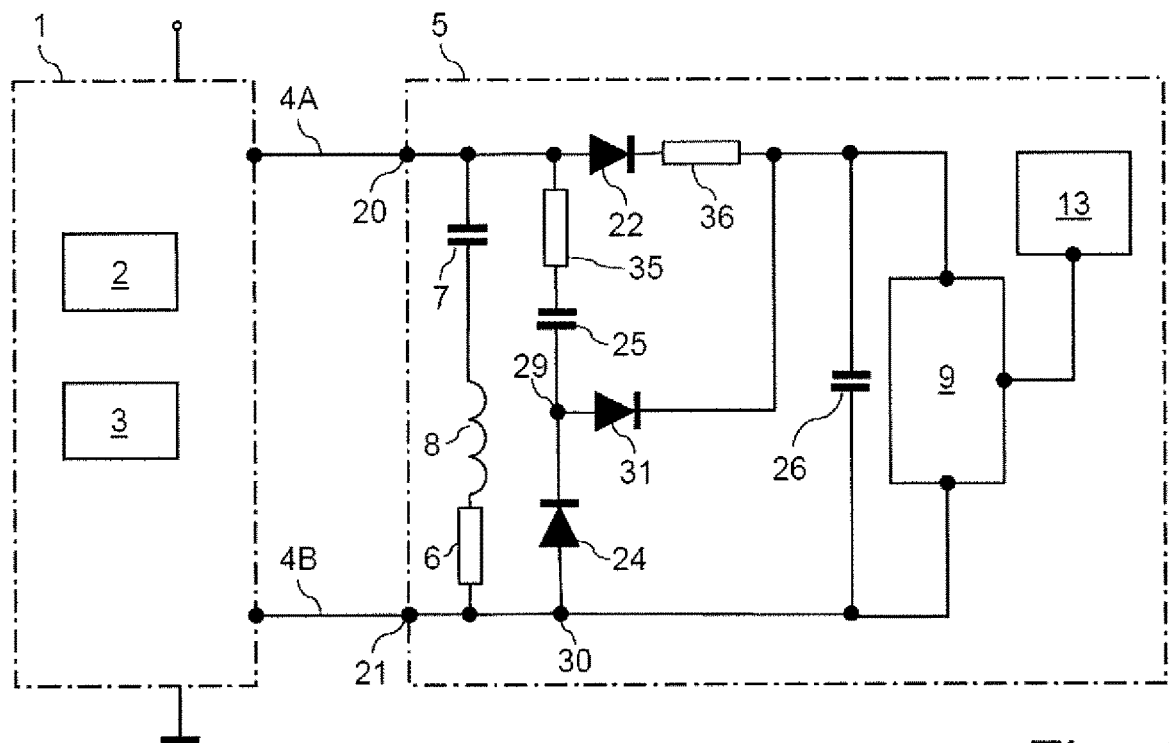
FIG. 4 shows a third embodiment of the circuit according to the present invention.

FIG. 4 shows a variant of the second embodiment from FIG. 3. There, ohmic resistor 35 of series circuit is connected between capacitor 30 and first contact 20. Moreover, the cathode of second rectifier 31 is connected directly to the voltage supply junction of control circuit 9, so that current-limiting resistor 36 in series with third rectifier 22 is coupled between the node connecting first capacitor 25 with contact 20 and the node connected to the voltage supply junction of control circuit 9.

Figure 5:
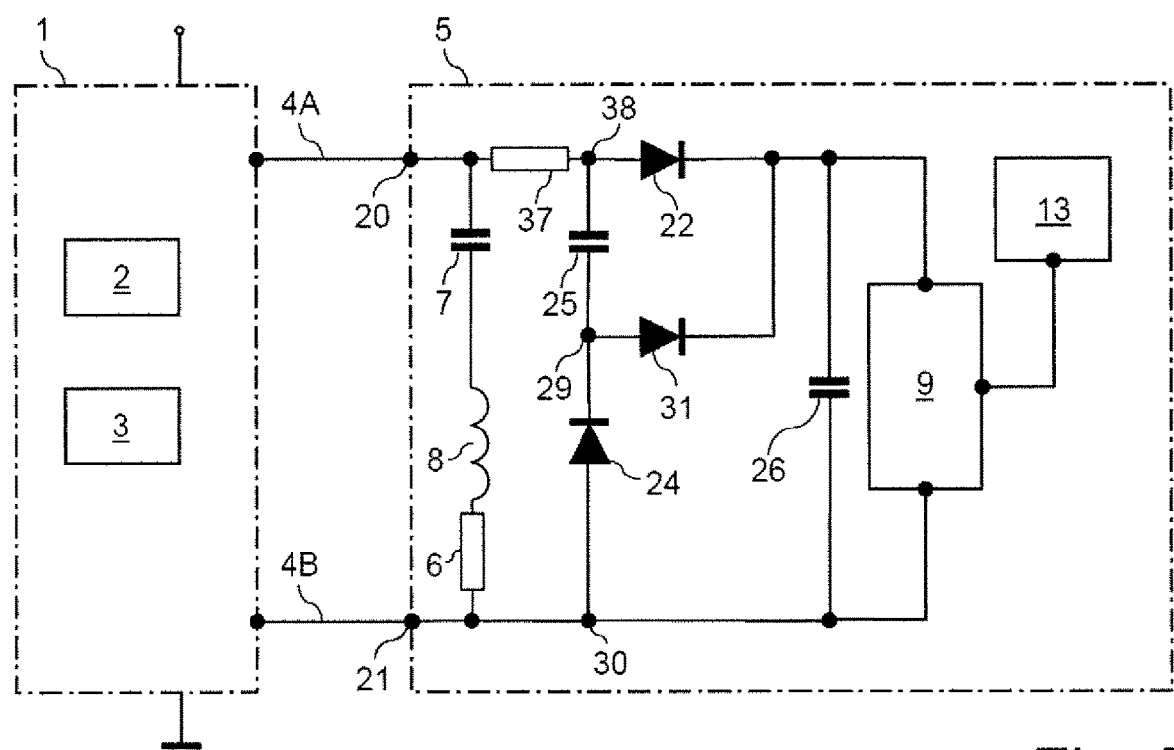
FIG. 5 shows a fourth embodiment of the circuit according to the present invention.

FIG. 5 shows a fourth embodiment of the vehicle door handle circuit 5 according to the present invention, which requires a minimal number of components. The series resonant circuit including capacitance 7, inductance 8 and ohmic resistor 6, again, is coupled between contacts 20 and 21. The feed quadripole circuit having an control circuit 9 coupled thereto is connected in parallel to the series resonant circuit. Again, sensor 13 is coupled to control circuit 9. The feed quadripole circuit, which here requires a minimal number of components, includes a series circuit of first rectifier 24 and first capacitor 25, which here is connected via resistor 37 to contact 20. Again, this series circuit has a tap 29 located between first capacitor 25 and the cathode of first rectifier 24. The anode of second rectifier 31 is connected to tap 29. The cathode of second rectifier 31 is connected directly to one of the two voltage supply junctions of control circuit 9. Buffer capacitor 26 is connected in parallel to the voltage supply junctions of control circuit 9. Third rectifier 22, which is connected in the forward-biased direction when feeding vehicle door handle circuit 5 with direct-current voltage, is coupled between the node connecting first capacitor 25 with resistor 37, and the node connecting the cathode of second rectifier 31 with the voltage supply junction of control circuit 9. Current-limiting resistor 37 connected upstream from the feed quadripole limits the current during direct-current voltage operation and also during alternating-current voltage signal feeding. In this exemplary embodiment, the feed quadripole, including first, second and third rectifiers 24, 31 and 25, first and second capacitors 25 and 26, and the only series resistor 37, in total has only six components.

The dimensioning of the different components is to be adapted to the desired transmitting frequency and also to the expected operating voltage. In all of the shown embodiments, the system can be fed, for example, at a frequency of 134.2 kHz having a voltage of 6.8 V. For example, first capacitor 25 can have a capacitance of 100 nF. For example, buffer capacitor 26 can have a capacitance of 4.7 nF. For example, resistors 27, 28, 35, 36 and 37 may have resistance values of 560Ω.

The invention claimed is:

1. A vehicle door handle circuit in a vehicle door handle, configured for coupling with a vehicle-sided control device, the vehicle door handle circuit comprising an antenna circuit for emitting a signal to be sent, a control circuit and at least one actuation sensor, the control circuit being coupled with the actuation sensor for detecting an actuation, the antenna circuit comprising a series resonant circuit having a resonant circuit inductance and a resonant circuit capacitance, the vehicle door handle circuit having two contacts for coupling to the vehicle-sided control device via only two connection cables, via which the vehicle door handle circuit can receive a direct-current supply voltage for supplying the control circuit or an alternating-current voltage signal for driving the antenna circuit from the vehicle-sided control device, the antenna circuit being coupled between the two contacts, the control circuit comprising a first and a second voltage supply junction each coupled to one of the two contacts, wherein, for the purpose of using a portion of the alternating-current voltage signal for the voltage supply of the control circuit, a series circuit, which comprises a first capacitor and a first rectifier connected in series, is connected between the two contacts and in parallel to the antenna circuit, wherein the first rectifier is connected in the reverse-biased direction with regard to the direct-current supply voltage, and a tap of the series circuit, located between the first capacitor and the first rectifier, is coupled with the first voltage supply junction of the control circuit, wherein at least one second rectifier is coupled between the tap and the first voltage supply junction and/or between the second voltage supply junction and the node, which connects one of the two contacts to the series circuit on the side of the first rectifier, wherein the second rectifier is coupled to the tap or the node, respectively, in the opposite polarity vis-à-vis the first rectifier and wherein, for feeding the direct-current supply voltage of the vehicle-sided control device, a third rectifier is coupled between the contact of the two contacts, which is connected to the series circuit on the side of the first capacitor, and the first voltage supply junction of the control circuit, wherein the third rectifier is connected in the forward-biased direction with regard to the direct-current supply voltage.

2. The vehicle door handle circuit according to claim 1, wherein the first capacitor has a capacitance of 10 nF to 500 nF.

3. The vehicle door handle circuit according to claim 2, wherein a second capacitor is connected between the voltage supply junctions of the control circuit.

4. The vehicle door handle circuit according to claim 3, wherein the second capacitor has a capacitance of 0.5 µF to 50 µF.

5. The vehicle door handle circuit according to claim 1, wherein the series circuit comprising the first capacitor and the first rectifier comprises a first ohmic resistor.

6. The vehicle door handle circuit according to claim 5, wherein the third rectifier is connected in series with at least one second ohmic resistor.

7. The vehicle door handle circuit according to claim 6, wherein a second capacitor is connected between the voltage supply junctions of the control circuit.

8. The vehicle door handle circuit according to claim 1, wherein the tap is coupled to the third rectifier in such a manner that the third rectifier is connected in parallel to the first capacitor, wherein the second rectifier is coupled between the tap and the first voltage supply junction or between the second voltage supply junction and the node, which connects one of the two contacts to the series circuit on the side of the first rectifier.

9. The vehicle door handle circuit according to claim 8, wherein a second capacitor is connected between the voltage supply junctions of the control circuit.

10. The vehicle door handle circuit according to claim 9, wherein the series circuit comprising the first capacitor and the first rectifier comprises a first ohmic resistor.

11. The vehicle door handle circuit according to claim 10, wherein the third rectifier is connected in series with at least one second ohmic resistor.

12. The vehicle door handle circuit according to claim 1, wherein the tap is coupled via the second rectifier to the third rectifier in such a manner that the third rectifier is connected in parallel to a series connection of the first capacitor and the second rectifier.

13. The vehicle door handle circuit according to claim 12, wherein a second capacitor is connected between the voltage supply junctions of the control circuit.

14. The vehicle door handle circuit according to claim 12, wherein the series circuit comprising the first capacitor and the first rectifier comprises a first ohmic resistor.

15. The vehicle door handle circuit according to claim 14, wherein the third rectifier is connected in series with at least one second ohmic resistor.

16. The vehicle door handle circuit according to claim 12, wherein an ohmic resistor is coupled between one of the two contacts and the node connecting the series circuit to the third rectifier.

17. The vehicle door handle circuit according to claim 16, wherein a second capacitor is connected between the voltage supply junctions of the control circuit.

18. The vehicle door handle circuit according to claim 17, wherein the first capacitor has a capacitance of 10 nF to 500 nF.

19. The vehicle door handle circuit according to claim 18, wherein the second capacitor has a capacitance of 0.5 µF to 50 µF.

* * * * *